(12) United States Patent
Joo et al.

(10) Patent No.: US 10,609,746 B2
(45) Date of Patent: Mar. 31, 2020

(54) METHOD AND APPARATUS FOR COMMUNICATION BETWEEN PEER DEVICES USING CYCLIC-SUPERFRAME

(71) Applicant: Electronics and Telecommunications Research Institute, Daejeon (KR)

(72) Inventors: Seong-Soon Joo, Daejeon (KR); Nae-Soo Kim, Daejeon (KR); Cheol Sig Pyo, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/926,815

(22) Filed: Mar. 20, 2018

(65) Prior Publication Data
US 2018/0270885 A1    Sep. 20, 2018

(30) Foreign Application Priority Data

Mar. 20, 2017   (KR) .................. 10-2017-0034778
Mar. 20, 2018   (KR) .................. 10-2018-0032129

(51) Int. Cl.
| | |
|---|---|
| H04W 4/00 | (2018.01) |
| H04W 76/14 | (2018.01) |
| H04W 74/08 | (2009.01) |
| H04W 8/00 | (2009.01) |
| H04W 84/18 | (2009.01) |

(52) U.S. Cl.
CPC ........... *H04W 76/14* (2018.02); *H04W 8/005* (2013.01); *H04W 74/0808* (2013.01); *H04W 84/18* (2013.01); *Y02D 70/00* (2018.01); *Y02D 70/20* (2018.01); *Y02D 70/22* (2018.01)

(58) Field of Classification Search
CPC . H04W 76/14; H04W 8/005; H04W 74/0808; H04W 84/18; Y02D 70/22; Y02D 70/00; Y02D 70/20
USPC ....................................................... 370/338
See application file for complete search history.

(56) References Cited

U.S. PATENT DOCUMENTS

| | | | |
|---|---|---|---|
| 9,179,269 B2 | 11/2015 | Lee et al. | |
| 9,301,246 B2 | 3/2016 | Joo | |
| 2007/0211686 A1* | 9/2007 | Belcea ................... | H04L 41/00 370/345 |

(Continued)

OTHER PUBLICATIONS

Joo, "Revised draft of Cyclic-superframe structure for 2nd recirculation WG letter ballot", Feb. 2017 (From Applicant's IDS) (Year: 2017).*

(Continued)

*Primary Examiner* — Mang Hang Yeung
(74) *Attorney, Agent, or Firm* — William Park & Associates Ltd.

(57) ABSTRACT

A method and an apparatus for communication between peer devices in which a cyclic-superframe including a plurality of superframes is used are provided. The method may include: receiving a discovery request command frame including information about a first cyclic-superframe for a peering period at an active contention access period (CAP) of the plurality of superframes; transmitting, to a peer device that has transmitted the discovery request command frame, a discovery response command frame corresponding to the discovery request command frame; and performing the peering period with the peer device based on the first cyclic-superframe.

18 Claims, 10 Drawing Sheets

(56) References Cited

U.S. PATENT DOCUMENTS

2014/0334338 A1* 11/2014 Joo .................. H04W 4/08
370/254
2015/0023342 A1* 1/2015 Joo .................. H04W 56/0035
370/350

OTHER PUBLICATIONS

Seong-Soon Joo, IEEE 802.15-17-0123-00-0008, IEEE P802.15 Working Group for Wireless Personal Area Networks (WPANs), "Revised draft of Cyclic-superframe structure for 2nd recirculation WG letter ballot", Feb. 15, 2017, pp. 1-26, IEEE.
Seong-Soon Joo, IEEE 802.15-17-0224-00-0008, IEEE P802.15 Working Group for Wireless Personal Area Networks (WPANs), "Revised draft of Cyclic-superframe structure for WG letter ballot #135", Mar. 22, 2017, pp. 1-52, IEEE.
Seong-Soon Joo, IEEE 802.15-17-0382-00-0008, IEEE P802.15 Working Group for Wireless Personal Area Networks (WPANs), "Revised draft of Cyclic-superframe structure for sponsor ballot recirculation", Jul. 10, 2017, pp. 1-52, IEEE.
Seong-Soon Joo, IEEE 802.15-17-0580-00-0008, IEEE P802.15 Working Group for Wireless Personal Area Networks (WPANs), "Revised draft of Cyclic-superframe structure", Nov. 1, 2017, pp. 1-50, IEEE.

* cited by examiner

FIG. 4

| Octets: 2 | 2 | 2 | 1 |
|---|---|---|---|
| Superframe Sequence Number | Cyclic-superframe Size | Number of Pattern A Superframe | Superframe Pattern Type |

FIG. 5

| Octets: 2 | 1 | 0/2/6 | 0/6/1/2 | variable | variable | 1 | Variable | 2 |
|---|---|---|---|---|---|---|---|---|
| Frame control | Sequence number | DA | SA/L-ID | Header IEs | Payload IEs | Command ID | content | FCS |
| MAC Header |||| | MAC Payload ||| | MAC footer |

FIG. 6

| Bit: 0 | 1 | 2 | 3 | 4 | 5 | 6 | 7 | 8 | 9 | 01 | 11 | 12 | 13 | 14 | 15 |
|---|---|---|---|---|---|---|---|---|---|---|---|---|---|---|---|
| Frame type | | | | DAM | | SAM | | AR/SNS | | Frame version | | HIEP | PIEP | SEC | R |

METHOD AND APPARATUS FOR COMMUNICATION BETWEEN PEER DEVICES USING CYCLIC-SUPERFRAME

CROSS-REFERENCE TO RELATED APPLICATION

This application claims priority to and the benefit of Korean Patent Applications Nos. 10-2017-0034778 and 10-2018-0032129 filed in the Korean Intellectual Property Office on Mar. 20, 2017 and Mar. 20, 2018, the entire contents of which are incorporated herein by reference.

BACKGROUND OF THE INVENTION

(a) Field of the Invention

This relates to a method and an apparatus for communication between peer devices by using cyclic-superframe including a plurality of superframes.

(b) Description of the Related Art

In the future IoT (Internet of Things) network, a plurality of objects located in the same space can recognize changes in the space; adaptively respond to occurrence events, and may perform grouping and collaborate with other objects to provide services. Each object belongs to at least one group, and is a peer device (PD) which is connected to other objects in the group in a peer-to-peer (P2P) manner and operates as a client or a server. The peer device may configure a P2P network by accessing radio resources to provide control information, sensing information, location information, advertisement, multimedia contents, and the like.

Single peer device may be included in a plurality of peer groups. A low-power radio link may be used for each group to form a plurality of groups in the same space. Meanwhile, no master coordinator for controlling the entire P2P network need to be used, and each peer device may autonomously configure a plurality of P2P networks. At this time, each peer device participating in the plurality of P2P networks at the same time need to be able to maintain the quality of service through a plurality of P2P links:

SUMMARY OF THE INVENTION

The present disclosure has been made in effort to provide a method and an apparatus for communication between peer devices by using cyclic-superframe including a plurality of superframes.

An exemplary embodiment provides a method for communication between peer devices in which a cyclic-superframe including a plurality of superframes is used, comprising: receiving a discovery request command frame including information about a first cyclic-superframe for a peering period at an active contention access period (CAP) of the plurality of superframes; transmitting, to a peer device that has transmitted the discovery request command frame, a discovery response command frame corresponding to the discovery request command frame; and performing the peering period with the peer device based on the first cyclic-superframe.

The transmitting a discovery response command frame may include transmitting the discovery response command frame to the peer device at a next active CAP which appears next to the active CAP.

The communication method may further include: deleting information about a second cyclic-superframe which has been used to be discovered by the peer device from a cyclic-superframe structure list after receiving the discovery request command frame; and adding the information about the first cyclic-superframe to the cyclic-superframe structure list.

The communication method may further include updating a background cyclic-superframe to a second cyclic-superframe which is used to be discovered by the peer device before receiving the discovery request command frame.

The communication method may further include: receiving a peering request command frame including information about a third cyclic-superframe which is used for data communication at an active peering period of the plurality of superframes from the peer device based on the first cyclic-superframe; transmitting a peering response command frame corresponding to the peering request command frame to the peer device; and performing the data communication with the peer device based on the third cyclic-superframe.

The communication method may further include: deleting the information about the first cyclic-superframe from a cyclic-superframe structure list after receiving the peering request command frame; and adding information about the third cyclic-superframe to the cyclic-superframe structure list.

The communication method may further include: receiving a cyclic-superframe advertise request command frame including information about a fourth cyclic-superframe which is used by a neighbor peer group from the neighbor peer group; and adding the information about the fourth cyclic-superframe to a cyclic-superframe neighbor list.

The receiving a cyclic-superframe advertise request command frame may include receiving the cyclic-superframe advertise request command frame at a peering period of the plurality of superframes, wherein the peering period is an active peering period or an inactive peering period.

The cyclic-superframe may include at least one first superframe which has a first pattern and at least one second superframe which has a second pattern, and the first pattern and the second pattern are determined based on an active state or an inactive state of a synchronization period, a discovery period, a peering period, the CAP, and a contention free period (OFF).

Another exemplary embodiment provides a peer device for communicating with another peer device using a cyclic-superframe including a plurality of superframes, comprising: a processor, a memory, and a radio frequency (RF) unit, wherein the processor executes a program stored in the memory to perform through the RF unit: receiving a discovery request command frame including information about a first cyclic-superframe for a peering period at an active contention access period (CAP) of the plurality of superframes; transmitting, to a first peer device that has transmitted the discovery request command frame, a discovery response command frame corresponding to the discovery request command frame; and performing the peering period with the first peer device based on the first cyclic-superframe.

When transmitting a discovery response command frame, the processor may perform transmitting the discovery response command frame to the first peer device at a next active CAP which appears next to the active CAP.

The processor may execute the program to further perform: deleting information about a second cyclic-superframe which has been used to be discovered by the another peer device from a cyclic-superframe structure list after receiving the discovery request command frame; and adding the information about the first cyclic-superframe to the cyclic-superframe structure list.

The processor may execute the program to further perform updating a background cyclic-superframe to a second cyclic-superframe which is used to be discovered by the other peer device before receiving the discovery request command frame.

The processor may execute the program to further perform through the RF unit: receiving a peering request command frame including information about a third cyclic-superframe which is used for data communication at an active peering period of the plurality of superframes from the first peer device based on the first cyclic-superframe; transmitting a peering response command frame corresponding to the peering request command frame to the first peer device; and performing the data communication with the first peer device based on the third cyclic-superframe.

The processor may execute the program to further perform: deleting the information about the first cyclic-superframe from a cyclic-superframe structure list after receiving the peering request command frame; and adding information about the third cyclic-superframe to the cyclic-superframe structure list.

The processor may execute the program to further perform: receiving a cyclic-superframe advertise request command frame including information about a fourth cyclic-superframe which is used by a neighbor peer group from the neighbor peer group; and adding the information about the fourth cyclic-superframe to a cyclic-superframe neighbor list.

When the processor performs the receiving a cyclic-superframe advertise request command frame; the processor may perform: receiving the cyclic-superframe advertise request command frame at a peering period of the plurality of superframes, wherein the peering period is an active peering period or an inactive peering period.

The cyclic-superframe may include at least one first superframe which has a first pattern and at least one second superframe which has a second pattern, and the first pattern and the second pattern are determined based on an active state or an inactive state of a synchronization period, a discovery period, a peering period, the CAP, and a contention free period (OFF).

Another exemplary embodiment provides a method for determining a start time of a cyclic-superframe including a plurality of superframes, comprising: receiving a cyclic-superframe advertise request command frame including information about neighbor cyclic-superframe which is used by a neighbor peer group at a peering period of the cyclic-superframe from the neighbor peer group; and determining the start time of the cyclic-superframe based on the information about the neighbor cyclic-superframe so as to avoid interference by the neighbor peer group.

The peering period may be an active peering period or an inactive peering period.

BRIEF DESCRIPTION OF THE DRAWINGS

FIG. 4 is a diagram illustrating an IE used by a peer device to provide configuration information of a cyclic-superframe to another peer device or neighbor peer groups according to an exemplary embodiment;

FIG. 5 is a diagram illustrating a control frame used by a peer device to provide configuration information of a cyclic-superframe to neighbor peer groups according to an exemplary embodiment;

FIG. 6 is a diagram illustrating a frame control field of the control frame of FIG. 5.

DETAILED DESCRIPTION OF THE EMBODIMENTS

Figure 1:
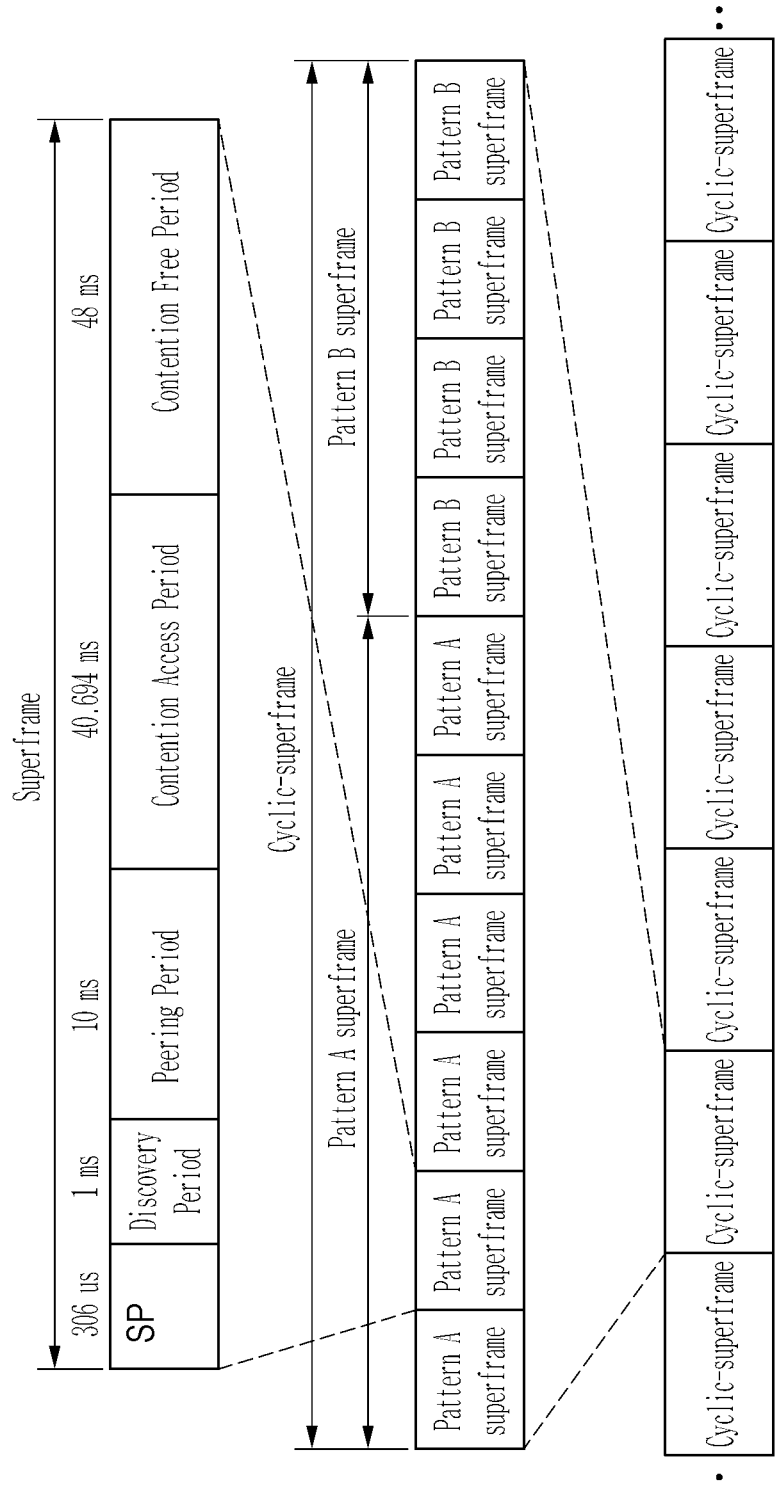
FIG. 1 shows a schematic diagram illustrating link resources of distributed P2P network using a low-power wireless link according to an exemplary embodiment.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

FIG. 1 shows a schematic diagram illustrating link resources of distributed P2P network using a low-power wireless link according to an exemplary embodiment.

Referring to FIG. 1, a peer device in a distributed P2P network accesses a link resource of the distributed P2P network by using a cyclic-superframe structure. Each cyclic-superframe may include a plurality of superframes which have a different pattern, respectively. Referring to FIG. 1, each cyclic-superframe includes six pattern A superframes and four pattern B superframes. The superframe includes a synchronization period (SP), a discovery period (DP), a peering period (PP), a contention access period (CAP), and a contention free period (OFF). In the synchronization period, the peer device may synchronize with a peer group. In the discovery period, the peer device may discover the peer group to access the peer group. In the peering period, the peer device may perform peering with another peer device included in the peer group. In the CAP, the peer device may contend with other peer devices to occupy the link resources. In the OFF, the peer device may be guaranteed for the link resources without contending with other peer devices. In the distributed P2P network according to the exemplary embodiment, the configuration of the cyclic-superframe may be determined according to the type or the attribute of the service provided to the peer device, and the low power quality guaranteed service may be provided to the peer device based on the cyclic-superframe structures.

Figure 2:
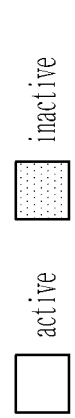
FIG. 2 shows a schematic diagram illustrating superframes having different configurations according to an exemplary embodiment.

FIG. 2 shows a schematic diagram illustrating superframes having different configurations according to an exemplary embodiment.

According to an exemplary embodiment, a pattern of the superframe may be determined according to whether each of the SP, the DP, the PP, the CAP, and the CFP is active or inactive. Referring to FIG. 2, the SP included in all superframes are always active, therefore the patterns of the superframes may be determined depending on whether each of the PP, the DP, the CAP, and the OFF is active or inactive. The number of the superframe patterns which are determined based on the state of the four different periods is 16 (24) (type 0000 to type 1111) because each period included in the superframe may have 2 different state (active or inactive).

Figure 3:
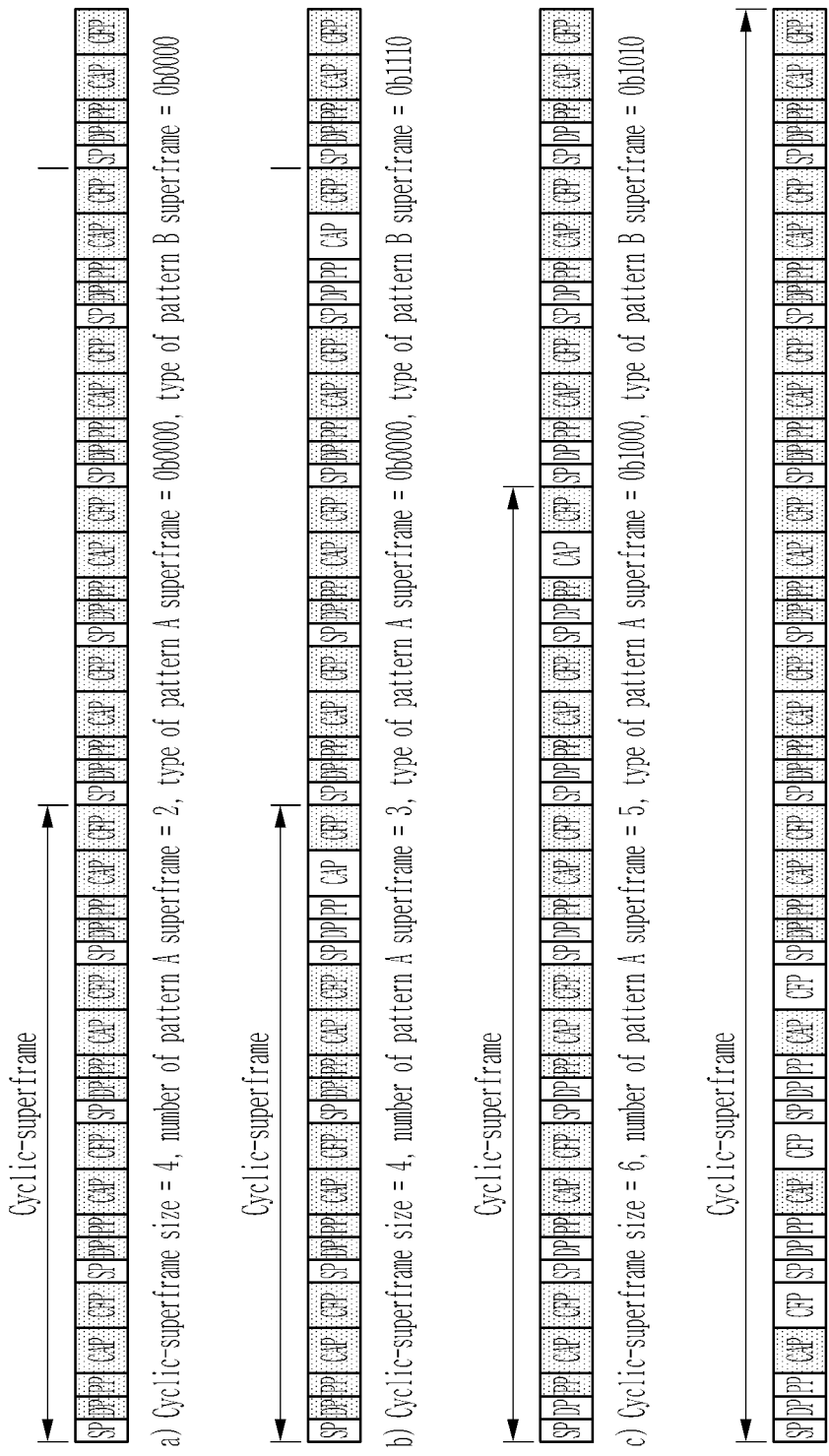
FIG. 3 shows a schematic diagram illustrating a cyclic-superframe according to an exemplary embodiment.

FIG. 3 shows a schematic diagram illustrating a cyclic-superframe according to an exemplary embodiment.

According to an exemplary embodiment, the configuration of the cyclic-superframe may include a size of the cyclic-superframe indicating the number of the superframes included in the cyclic-superframe, the number of the pattern A superframes, the number of the pattern B superframes, the type of the pattern A superframe, or the type of the pattern B superframe. The maximum size of the cyclic-superframe is 4,096.

In FIG. 3, the size of the cyclic-superframe (a) is 4 (i.e., the cyclic-superframe (a) includes 4 superframes) (cyclic-superframe size=4), the number of the pattern A superframe is 2 (number of pattern A superframe=2), the type of the pattern A superframe is 0000, and the type of the pattern B superframe is 0000. That is, since only SP is active in the cyclic-superframe (a), the cyclic-superframe (a) may correspond to a link resource used for synchronization of the peer device. The DP and the PP are active for every four superframes in the cyclic-superframe (b), so that the type of the pattern A superframe of the cyclic-superframe (b) is 0000 and the type of the pattern B superframe of the cyclic-superframe (b) is 1110. The CAP is active for every six superframes in the cyclic-superframe (c), and the SP and the DP are active in the rest superframes. Therefore, the type of the pattern A superframe of the cyclic-superframe (c) is 1000 and the type of the pattern B superframe of the cyclic-superframe (c) is 1010. The OFF is active for three superframes of the nine superframes included in the cyclic-superframe (d), and the only SP is active for rest superframes. Therefore, the type of the pattern A superframe of the cyclic-superframe (d) is 1101 and the type of the pattern B superframe of the cyclic-superframe (d) is 0000.

The PIB macCyclicSuperframeEnabled is set to TRUE, the MAC layer may maintain the cyclic-superframe structure and manage the reception and the transmission of the frames. Since the peer device according to an exemplary embodiment may be included in several peer groups at the same time, a media access control (MAC) sublayer of the peer device may concurrently operate a plurality of cyclic-superframes. The configuration of the cyclic-superframe operated by the peer device may be determined by a next higher layer of the peer device. The next higher layer may configure a cyclic-superframe for providing an application service. The next higher layer may configure a background cyclic-superframe to instruct the MAC sublayer of the peer device to turn on the transceiver of the peer device according to the configured cyclic-superframe for providing at least one active period in which a request command frames, for example the Cyclic-superframe Advertise Request command frames is received or transmitted. That is, through the turn-on of the transceiver, the cyclic-superframe advertise request command frame or the like is transmitted or received in the active period. The background cyclic-superframe of the peer device may be always present and may be updated when a cyclic-superframe is added or deleted for an application service.

A configuration of the cyclic-superframe according to the exemplary embodiment may be stored in a cyclic-superframe descriptor of the PIB macCyclicSuperframeStructureList. Table 1 shows the cyclic-superframe descriptor.

TABLE 1

| Name | Type | Valid range | Description |
| --- | --- | --- | --- |
| Initiator PD address | Octet | 6 octets | MAC address of the initiator of the PAC group. |
| Multicast group address | Octet | 2 octets | Multicast group address of the PAC group. |
| Cyclic-superframe size | Octet | 1-4096 | Number of superframes in a cyclic-superframe. |
| Number of pattern A superframe | Octet | 0-4096 | Number of pattern A superframes in a cyclic-superframe |
| Type of pattern A superframe | Octet | As defined in FIG. 2 | State indicator of periods of pattern A superframe |
| Type of pattern B superframe | Octet | As defined in FIG. 2 | State indicator of periods of pattern B superframe |
| Start time of cyclic-superframe | Octet | 0-4095 | Superframe sequence number starting the cyclic-superframe, as defined in clause 6.1.2.3. |

The configuration of the cyclic-superframe may be identified by the MAC address of a peer device which starts the cyclic-superframe and the cyclic-superframe identifier selected by the MAC sublayer of the peer device. The cyclic-superframe identifier of the background cyclic-superframe is 0. The structure of the cyclic-superframe may be modified by the next higher layer of the peer device through a MLME-CYCLICSUPERFRAME.request primitive. The modification of the cyclic-superframe may refer to addition, update, or deletion of the cyclic-superframe descriptor in the macCyclicSuperframeStructureList PIB (PAC Information base). Equation 1 refers to an MLME-CYCLICSUPERFRAME.request primitive used to configure the cyclic-superframe structure by the next higher layer, and table 2 refers to descriptions of the MLME-CYCLICSUPERFRAME.request primitive.

[Equation 1]

$$\text{MLME-CYCLICSUPERFRAME.request (}$$
$$\quad \text{Handle;}$$
$$\quad \text{Manipulation Type;}$$
$$\quad \text{Cyclic-Superframe Descriptor;}$$
$$\text{)}$$

TABLE 2

| Name | Type | Valid range | Description |
| --- | --- | --- | --- |
| Handle | Integer | 0x00-0xff | Unique identifier of the cyclic-superframe structure manipulation request. |
| Manipulation Type | Enumeration | DEFAULT, ADD, DELETE | Indicates the type of cyclic-superframe structure manipulation. DEFAULT for inserting default cyclic-superframe configuration. ADD for adding a cyclic-superframe descriptor of a PAC group to the macCyclicSuperframeStructureList. DELETE for deleting a cyclic-superframe descriptor of a PAC group from the macCyclicSuperframeStructureList. |
| Cyclic-Superframe Descriptor | As defined in FIG. 4 | As defined in FIG. 4 | Indicates the structure of cyclic-superframe for a PAC group. |

Equation 2 refers to an MLME-CYCLICSUPERFRAME-.confirm primitive used to respond to the request primitive of the next higher layer for configuring the cyclic-superframe structure, and table 3 refers to descriptions of the MLME-CYCLICSUPERFRAME.confirm primitive.

$$\text{MLME-CYCLICSUPERFRAME.confirm (} \\ \text{Handle;} \\ \text{Status;} \\ \text{)} \qquad \text{[Equation 2]}$$

TABLE 3

| Name | Type | Valid range | Description |
| --- | --- | --- | --- |
| Handle | Integer | 0x00-0xff | Unique identifier of the cyclic-superframe structure manipulation request. |
| Status | Enumeration | SUCCESS, INVALID_PARAMETER, UNKNOWN, MAX_LIST_EXCEEDED | Result of the request operation. |

The Status of the primitive may indicate SUCCESS if the operation completed successfully. If any of the arguments fail a range check, the Status may be INVALID_PARAMETER. If a cyclic-superframe descriptor is being added and the macCyclicSuperframeStructureList is already full, the Status may be MAX_LIST_EXCEEDED. The maximum length of macCyclicSuperframeStructureList is implementation dependent, but a minimum length of ten is recommended. If an update or deletion is being requested and the corresponding cyclic-superframe descriptor cannot be found, the Status may be UNKNOWN. The status of UNSUPPORTED indicates that the Cyclic-Superframe is not supported.

Table 4 refers to PIBs of the PAC network using a cyclic-superframe structure according to an exemplary embodiment.

TABLE 4

| Field | Type | Range | Default | Description |
| --- | --- | --- | --- | --- |
| macCyclicSuperframeStructureList | List of cyclic-superframe descriptors | As defined in FIG. 4 | Implementation specific | The list of the cyclic-superframe descriptor of PAC groups which the PD is joining. The first element of the list is reserved for default cyclic-superframe descriptor of the PD. |
| macCyclicSuperframeNeighborList | List of cyclic-superframe descriptors | As defined in FIG.4 | Implementation specific | The list of the cyclic-superframe descriptor of discovered neighbor PAC groups. |
| macCyclicSuperframeEnabled | Boolean | TRUE, FALSE | Implementation specific | This attribute enables or disables the cyclic-superframe structure. |

TABLE 4-continued

| Field | Type | Range | Default | Description |
|---|---|---|---|---|
| macCyclicSuperframeCount | Enumeration | 0-4095 | 0 | The 4,096 modulo operated count of past superframes showed after synchronization. |

According to an exemplary embodiment, the PIB consists of the parameters and constants required to manage the MAC layer and the PHY of the peer device. In table 4, the field names of the PIB starts with 'mac', so the PIBs in table 4 are the MAC sublayer related PIB. The MAC sublayer of the peer device may control the physical layer (PHY) of the peer device according to the cyclic-superframe. The MAC sublayer of the peer device may control the PHY by using the cyclic-superframe count PIB (macCyclicSuperframeCount) of table 4. The cyclic-superframe count PIB may represent the number of the superframes after the peer device performs synchronization. The cyclic-superframe count PIB is a value calculated by a modulo operation for the number of the superframes by 4,096. The cyclic-superframe count PIB may be a criterion for distinguishing the cyclic-superframes The start time of the cyclic-superframe may be determined as shown in Equation 3.

$$\{(macCyclicSuperframeCount\ value-superframe\ sequence) + n \times cyclic\text{-}superframe\ size\} modulo\ 4{,}096 \quad [\text{Equation 3}]$$

A peer device according to an exemplary embodiment may participate in a plurality of peer groups having different cyclic-superframe configurations. Different cyclic-superframe sizes and start times of different cyclic-superframes cause superposition of the different cyclic-superframes, and some periods may be shared among multiple peer groups. To know which period of the superframe is active, the peer group may maintain an operation map of the cyclic-superframe. The operation map of the cyclic-superframe may consist of 4×4,096 bitmaps, and the bitmap may display the active state or the inactive state of the DP, PP, CAP, and OFF of the superframe included in the cyclic-superframe in operation.

FIG. 4 is a diagram illustrating an IE used by a peer device to provide configuration information of a cyclic-superframe to another peer device or neighbor peer groups according to an exemplary embodiment, FIG. 5 is a diagram illustrating a control frame used by a peer device to provide configuration information of a cyclic-superframe to neighbor peer groups according to an exemplary embodiment, and FIG. 6 is a diagram illustrating a frame control field of the control frame of FIG. 5.

The Superframe Sequence Number field in FIG. 4 includes a sequence number of a superframe transmitting a cyclic-superframe descriptor IE, which is counted from the beginning of the cyclic-superframe. The Cyclic-superframe Size field indicates the number of the superframes included in the cyclic-superframe. The number of Pattern A Superframe field indicates the number of pattern A superframes included in the cyclic-superframe. The Superframe Pattern Type indicates the type of the pattern A superframe and the type of the pattern B superframe.

The cyclic-superframe descriptor IE may include a cyclic-superframe descriptor in the macCyclicSuperframeStructureList indexed with an address of the initiator peer device. The Superframe sequence number field of the cyclic-superframe descriptor IE field may be set to a value calculated by the macCyclicSuperframeCount and the start time of the cyclic-superframe parameter of the cyclic-superframe descriptor. The cyclic-superframe size field of the cyclic-superframe descriptor IE field may be set to the cyclic-superframe size parameter of the cyclic-superframe descriptor. The pattern A superframe field of the cyclic-superframe descriptor IE field may be set to the number of pattern A superframes parameter of the cyclic-superframe descriptor. The type field of the pattern A superframe in the cyclic-superframe descriptor IE field may be set to the type parameter of the pattern A superframe of the cyclic-superframe descriptor. The type field of the pattern B superframe in the cyclic-superframe descriptor IE field may be set to the type parameter of the pattern B superframe of the cyclic-superframe descriptor.

The DAM field in FIG. 6 may be set to broadcast. The SAM field may be set to a MAC address. The AR/SNS field may be set to b'00. The HIEP field may be set to 1. The SEC field may be set to 1. The PIEP field may be set to 0.

Figure 7:
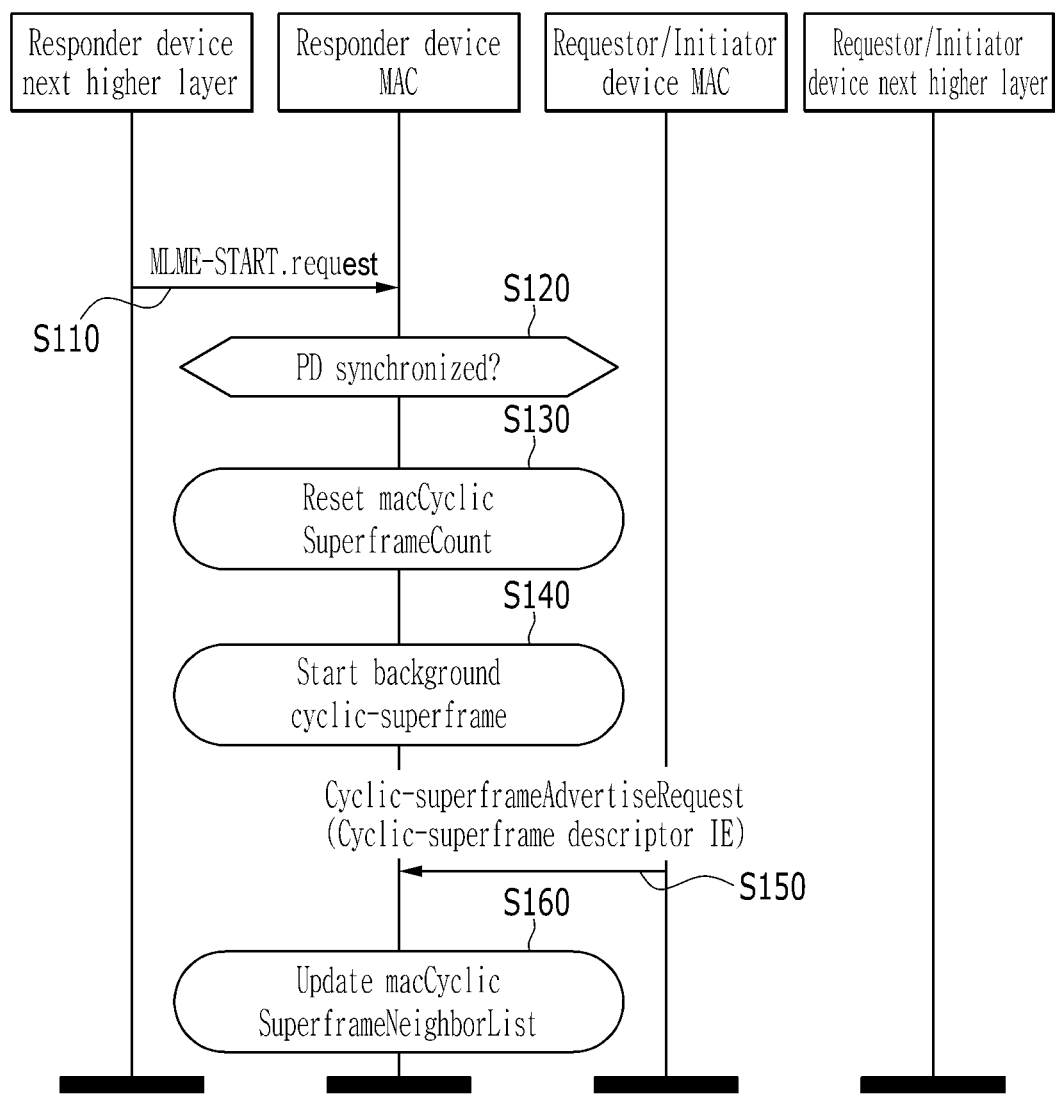
FIG. 7 is a flowchart illustrating a method of starting a peer device according to an exemplary embodiment.
Figure 8:
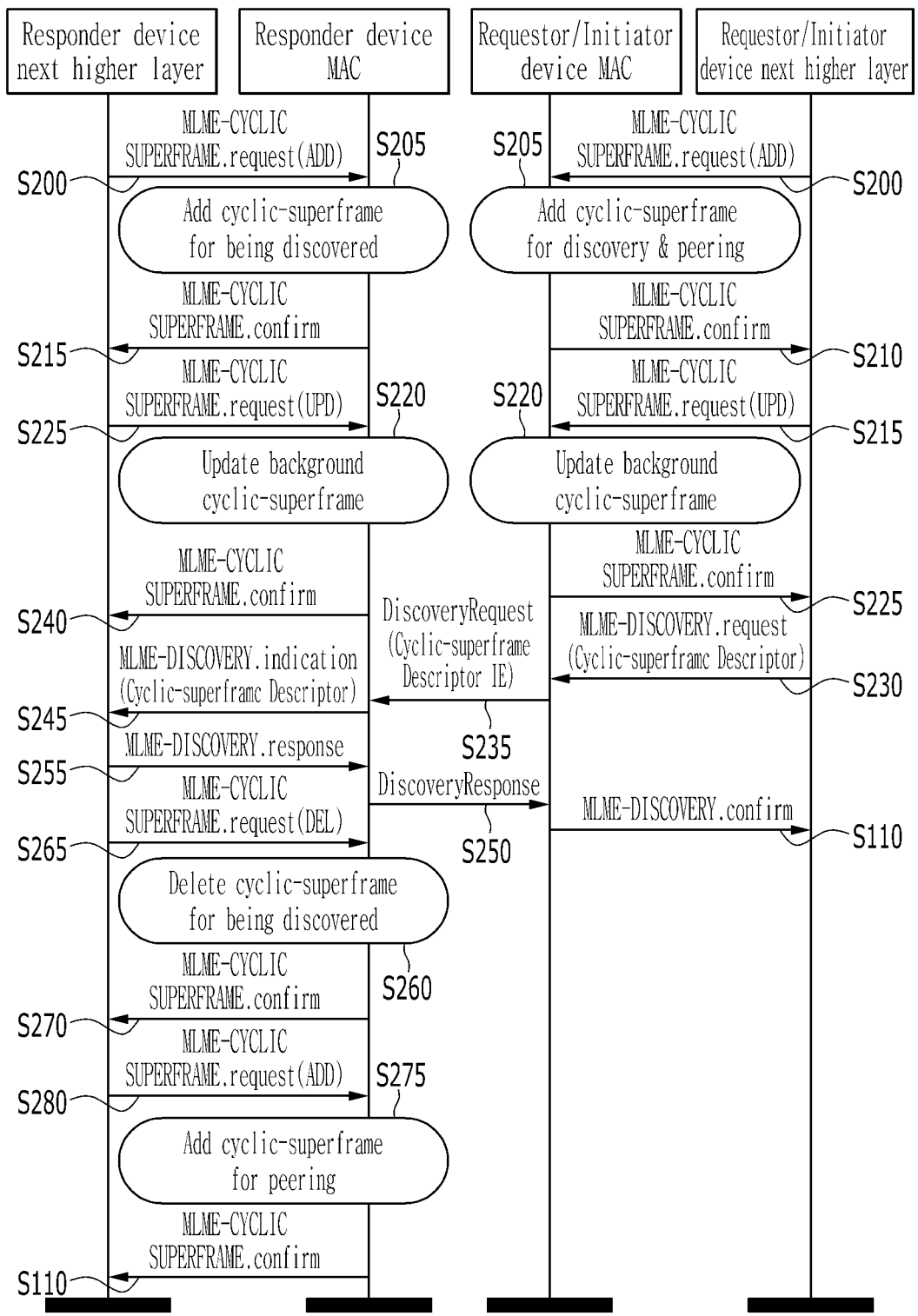
FIG. 8 is a flowchart illustrating a discovery procedure of a peer device according to an exemplary embodiment.
Figure 9:
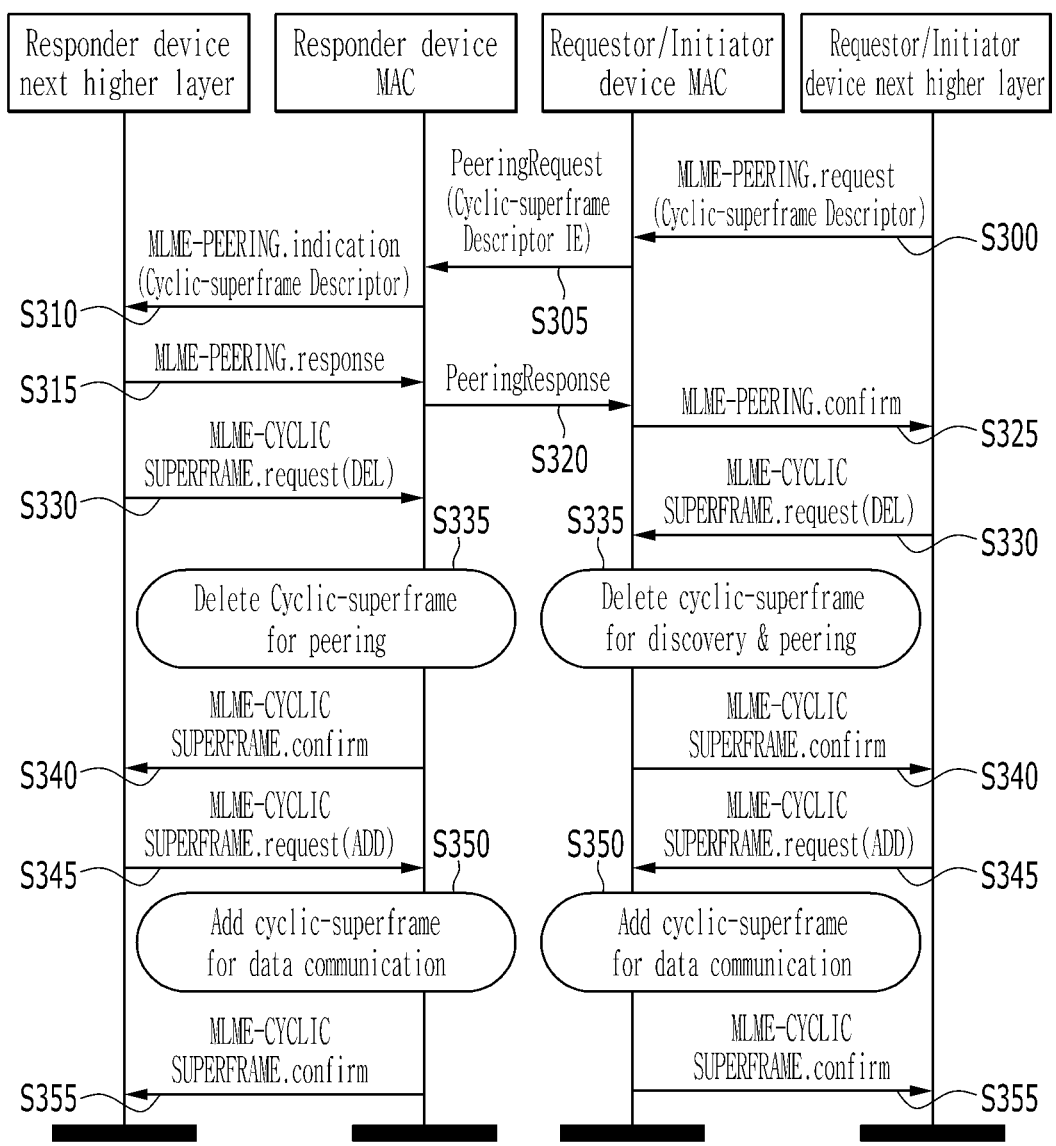
FIG. 9 is a flowchart illustrating a peering procedure of a peer device according to an exemplary embodiment.

Referring to FIGS. 7 to 9, a communication method of the peer device is described below.

FIG. 7 is a flowchart illustrating a method of starting a peer device according to an exemplary embodiment.

After the peer device is started, the next higher layer of the peer device sends the MLME-START.request primitive to the MAC sublayer of the peer device (S110). The MLME-START.request primitive has a manipulation type parameter set to DEFAULT, and the MAC sublayer of the peer device maintains an initial cyclic-superframe configuration. After synchronization (S120), the MAC sublayer of the peer device resets a cyclic-superframe count PIB (macCyclicSuperframeCount) (S130). In addition, the MAC sublayer of the peer device starts to control the PHY according to the background cyclic-superframe (S140). The background cyclic-superframe may have a default value defined in the cyclic-superframe structure list PIB (macCyclicSuperframeStructureList).

The MAC sublayer of the peer device receives signals during the peering period to avoid interference with the neighbor peer groups by using information of the cyclic-superframe of the neighbor peer groups (S150). At this time, the MAC sublayer of the peer device may receive the signals during the peering period within a predetermined window (aCyclicSuperframeAdvWindow) superframes. The cyclic-superframe descriptor of the neighbor peer groups is newly added to the cyclic-superframe neighbor list PIB (macCyclicSuperFrameNeighborList).

The information about the cyclic-superframe of the neighbor peer groups may be received from the Cyclic-superframe Advertise Request command frame. The MAC sublayer of the peer device may randomly select one superframe of every aCyclicSuperframeAdvWindow superframe to transmit the Cyclic-superframe Advertise Request command frame. According to an exemplary embodiment, the MAC sublayer of the peer device may periodically transmit the cyclic-superframe advertise request command frame in the peering period of the selected superframe, and even if the selected peering period is inactive, the cyclic-superframe advertise request command frame may be transmitted. The cyclic-superframe advertise request command frame may correspond to single cyclic-superframe configuration. When an initiator peer device initiates a plurality of peer groups and maintains a plurality of cyclic-superframe configurations, the cyclic-superframe advertise request command frame may be sent separately for each of the cyclic-superframe configuration. The plurality of cyclic-superframe advertise request command frame may be advertised within the aCyclicSuperframeadvWindow superframe.

A header information element (IE) of the cyclic-superframe advertise request command frame may carry the cyclic-superframe configuration of the peer group. The MAC sublayer of the peer device which receives the cyclic-superframe advertises request command frame adds the information about the cyclic-superframe which is used by the neighbor peer group to the cyclic-superframe list PIB (macCyclicSuperframeNeighborList) (S160). The next higher layer of the peer device may then determine the start time of the cyclic-superframe based on the cyclic-superframe list PIB, which can avoid the interference with the neighbor peer groups when starting a new peer group. That is, the peer device may dynamically (or adaptively) determine the start time of the cyclic-superframe on the operation map in order to minimize the superposition of the active period of its cyclic-superframe with the active period of neighbor cyclic-superframe being operated by the neighbor peer groups. If the cyclic-superframe advertise request command frame for any specific peer group is not received for a predetermined duration which corresponds to a predetermined number (e.g., 5), of consecutive aCyclicSuperframeadvWindow superframes, the MAC sublayer may delete the cyclic-superframe descriptor of the peer group from the cyclic-superframe list PIB.

FIG. 8 is a flowchart illustrating a discovery procedure of a peer device according to an exemplary embodiment.

The peer device according to an exemplary embodiment may use a Discovery Request command frame to discover other peer devices or to be discovered by the other peer devices. The generation of the discovery request command frame may be determined according to the needs of the application running on the peer device. The discovery request is a request to check whether a peer device capable of executing a specific application exists in the vicinity. The discovery request including the cyclic-superframe descriptor IE according to the exemplary embodiment may be sent during the active CAP. The discovery request may be sent to a specific peer device, or broadcast to an unspecified number of the peer devices. The peer device may transmit the discovery request in expecting a discovery response.

First, the next higher layer of the peer device may select a new cyclic-superframe configuration in order to be discovered by other peer devices. The new cyclic-superframe to be discovered by the other peer devices may be added by an MLME-CYCLICSUPERFRAME.request primitive transferred from the next higher layer of the MAC sublayer (S200). The MLME-CYCLICSUPERFRAME.request primitive has a Cyclic-superframe Descriptor parameter and a Manipulation Type parameter set to ADD. The cyclic-superframe descriptor parameter may include an initiator peer device address (Initiator PD address) indicating a MAC address of the initiator peer device, a cyclic-superframe identifier selected by the next higher layer to register the cyclic-superframe descriptor to the cyclic-superframe structure list PIB, the cyclic-superframe size, the number of pattern A superframes, the number of pattern B superframes, the type of the pattern A superframe, the type of the pattern B superframe, and the start time of the cyclic-superframe. The MAC sublayer adds the cyclic-superframe descriptor to the cyclic-superframe structure list PIB (S205), and transfers the MLME-CYCLICSUPERFRAME.confirm primitive to the next higher layer (S210). The cyclic-superframe added by the MAC sublayer of the requester peer device is for the discovery procedure and the peering procedure. The cyclic-superframe added by the MAC sublayer of the responder peer device is to be discovered by other peer devices. A new cyclic-superframe operation to be discovered by the others may start according to the start time of the cyclic-superframe of the cyclic-superframe descriptor parameter.

The next higher layer of the peer device may transfer the MLME-CYCLICSUPERFRAME.request primitive to the MAC sublayer (S215), and then the background cyclic-superframe may be updated (S220). The MLME-CYCLICSUPERFRAME.request primitive has a manipulation type parameter set to UPDATE and the cyclic-superframe descriptor parameter. The cyclic-superframe descriptor may include a initiator peer device address set to the MAC address of the peer device, a cyclic-superframe identifier set to 0, the modified cyclic-superframe structure, and the start time of the cyclic-superframe set to the start time of the cyclic-superframe descriptor parameter included in the MLME-CYCLICSUPERFRAME.request primitive. The MLME-CYCLICSUPERFRAME.request primitive may be transferred from the next higher layer to the MAC sublayer of the peer device to be added as a new cyclic-superframe of the discovery procedure for being discovered by the others. Then, the MAC sublayer transfers the MLME-CYCLICSUPERFRAME.confirm primitive to the next higher layer (S225).

The next higher layer may use the MLME-CYCLICSUPERFRAME.request primitive to start the 2-way untargeted discovery, the targeted discovery, or many-to-many group discovery (S230). That is, the next higher layer may add the cyclic-superframe structure having a new cycle for the discovery procedure and the peering procedure by using the MLME-CYCLICSUPERFRAME.request primitive. The MLME-CYCLICSUPERFRAME.request primitive for the discovery procedure and the peering procedure may include a discovery resource parameter (Discovery Resource), a minimum discovery range parameter (Discovery Range Min), a maximum discovery range parameter (Discovery Range Max), a destination address parameter (Destination Address), a multicast address parameter (Multicast Address), an address mode parameter (Address Mode), and a cyclic-superframe descriptor. The cyclic-superframe descriptor may be the same for the primitives of the discovery procedure and the primitives of the peering procedure.

Then, the requestor (or initiator) peer device transmits a Discovery Request command frame during the active CAP period of the cyclic-superframe to the responder peer device (S235). At this time, the MAC sublayer of the requestor peer device may transmit the discovery request command frame in the nearest active CAP. The cyclic-superframe descriptor IE field of the discovery request command frame includes a cyclic-superframe descriptor parameter of the MLME-DISCOVER.request primitive.

The MAC sublayer of the responder peer device receiving the discovery request command frame from the requestor peer device informs the receiving of the discovery request command frame by transferring the MLME-DISCOVERY.indication primitive to the next higher layer (S240). The MLME-DISCOVERY.indication primitive includes a discovery type parameter (Discovery Type) and the cyclic-superframe descriptor parameter. The cyclic-superframe descriptor parameter may be duplicated from the Cyclic-Superframe Descriptor IE field of the discovery request.

If the next higher layer of the responder peer device is to be discovered by the requestor peer device, the next higher layer of the responder transfers the MLME-DISCOVERY.response primitive to the MAC sublayer (S245) and the MAC sublayer of the responder peer device sends the Discovery Response command frame to the requestor peer device (S250). The MAC sublayer of the requestor peer device receiving the discovery response command frame from the responder peer device may inform the receiving of the discovery response for the discovery request to the next higher layer by using the MLME-DISCOVERY.confirm primitive.

Then, the next higher layer of the responder peer device may instruct the MAC sublayer to use the cyclic-superframe structure of the request peer device. First, the next higher layer of the responder peer device transfers to the MAC sublayer the MLME-CYCLICSUPERFRAME.request primitive in which the manipulation type parameter is set to DELETE (S255). The MAC sublayer of the responder peer device deletes the cyclic-superframe descriptor of the MLME-CYCLICSUPERFRAME.request primitive (that is, the information about the cyclic-superframe to be used for being discovered in the discovery procedure) from the cyclic-superframe structure list PIB (S260). At this time, the MAC address of the initiator peer device and the cyclic-superframe descriptor identified by the cyclic-superframe identifier may be deleted from the cyclic-superframe structure list PIB. The cyclic-superframe descriptor parameter of the MLME-CYCLICSUPERFRAME.request primitive in which the manipulation type parameter is set to DELETE may include the an address of the initiator peer device set with the MAC address of the peer device, a cyclic-superframe identifier set with the registered cyclic-superframe identifier, and a start time of the cyclic-superframe selected by the next higher layer. Then, the MAC sublayer informs that the information about the cyclic-superframe structure which has been used for the discovery procedure by transferring the MLME-CYCLICSUPERFRAME.confirm primitive to the next higher layer (S265).

The next higher layer of the responder peer device transfers the MLME-CYCLICSUPERFRAME.request primitive with the manipulation type parameter set to ADD to the MAC sublayer (S270). The cyclic-superframe descriptor parameter of the MLME-CYCLICSUPERFRAME.request primitive with the manipulation type set to ADD is the same as the cyclic-superframe descriptor of the MLME-DISCOVERY.indication primitive. The MAC sublayer adds the cyclic-superframe descriptor of the MLME-CYCLICSUPERFRAME.request primitive to the cyclic-superframe structure list PIB (S275). The MAC sublayer of the responder peer device may then transfer the MLME-CYCLICSUPERFRAME.confirm primitive to the next higher layer, and the next higher layer of the responder peer device may start operation of the updated cyclic-superframe structure at the start time of the cyclic-superframe included in the cyclic-superframe descriptor parameter of the MLME-CYCLICSUPERFRAME.request primitive (S280).

FIG. 9 is a flowchart illustrating a peering procedure of a peer device according to an exemplary embodiment.

The next higher layer of the initiator peer device (or requester peer device) transfers the MLME-PEERING.request primitive to the MAC sublayer of the initiator peer device to configure the cyclic-superframe structure for data communication (S300). The MLME-PEERING.request primitive in FIG. 9 may include a request type parameter (Request Type), a channel page parameter (Channel Page), a channel number parameter (Channel Number), a group ID parameter (Group ID), an application ID parameter (Application ID), a destination address parameter (Destination Address), a multicast address parameter (Multicast Address), a peer device list parameter (PD List), a PHY capability list parameter (PHY Capability List), a elliptic curve parameter (Elliptic Curve), a key descriptor parameter (Key Descriptor), and a cyclic-superframe descriptor parameter. The MAC sublayer of the initiator peer device transmits the peering request command (Peering Request) frame to the responder peer device during the active peering period (S305). The cyclic-superframe descriptor IE field of the peering request command frame may include cyclic-superframe descriptor parameter of the MLME-PEERING.request primitive.

The MAC sublayer of the responder peer device receiving the peering request command frame from the initiator peer device report the receiving of the peering request command frame to the next higher layer by using the MLME-PEERING.indication primitive (S310). The MLME-PEERING.indication primitive may include a request type parameter (Request Type), a source address parameter (Source Address), a channel page parameter (Channel Page), a channel number parameter (Channel Number), a group ID parameter (Group ID), an application ID parameter (Application ID), a PHY capability list parameter (PHY Capability List), and a Cyclic-superframe Descriptor parameter. The cyclic-superframe parameter is duplicated from the cyclic-superframe descriptor IE field of the peering request command and is for data communication between the requestor peer device and the responder peer device. If the next higher layer of the responder peer device wishes to peer with the requestor peer device, the next higher layer sends the MLME-PEERING.response primitive to the MAC sublayer of the responder peer device (S315). The MAC sublayer of the responder peer device then sends a peering response command (PeeringResponse) frame to the requestor peer device at a near active peering period (S320), and the MAC sublayer of the requestor peer device reports the receiving of the peering response command frame to the next higher layer by using the MLME-PEERING.confirm primitive (S325).

The next higher layers of the requestor peer device and the responder peer device transfers the MLME-CYCLICSUPERFRAME.request primitive to delete the cyclic-superframe structure which has been used for peering (S330). At this time, the manipulation type parameter of the MLME-CYCLICSUPERFRAME.request primitive may be set to DELETE'. The MAC sublayer of the requestor peer device and the responder peer device deletes the cyclic-superframe descriptor parameter (that is, the information about the cyclic-superframe which have been used for the discovery procedure and the peering procedure) from the cyclic-superframe structure list PIB (S335). The cyclic-superframe descriptor parameter of the MLME-CYCLICSUPERFRAME.request primitive may include an address of the requestor peer device set to the MAC address of the peer device, a cyclic-superframe identifier set to the registered cyclic-superframe identifier, and a start time of the cyclic-superframe selected by the next higher layer. The MAC sublayer indicates that the information about the cyclic-superframe which is used for the peering procedure is deleted by transferring the MLME-CYCLICSUPERFRAME.confirm primitive to the next higher layer (S340).

The next higher layer of the requestor peer device and the responder peer device then sends the MLME-CYCLICSUPERFRAME.request primitive in which the manipulation type parameter is set to ADD to the MAC sublayer (S345). In this case, the cyclic-superframe descriptor parameter of the MLME-CYCLICSUPERFRAME.request primitive is the same as the cyclic-superframe descriptor parameter of the MLME-PEERING.indication primitive. The MAC sublayer of the requestor peer device and the responder peer device adds the cyclic-superframe descriptor of the MLME-CYCLICSUPERFRAME.request primitive (that is, the descriptor of the cyclic-superframe for the data communication) to the cyclic-superframe structure list PIB (S350). When the plurality of cyclic-superframes is in operation, the newly added cyclic-superframe may be overwritten in the currently operated cyclic-superframes. The MAC sublayer of the requestor peer device and the responder peer device informs that the cyclic-superframe for the data communication is ready to be used by sending the MLME-CYCLICSUPERFRAME.confirm primitive to the next higher layer (S355). The next higher layer of each of the peer device may start the updated cyclic-superframe structure at the start time of the cyclic-superframe included in the cyclic-superframe descriptor parameter of the MLME-CYCLICSUPERFRAME.request primitive.

According to the above exemplary embodiment, each peer device can efficiently discover other peer devices in a P2P network, low-power operation for the peer devices becomes possible due to the minimized interference between peer groups, and quality of service over the P2P link is maintained.

Figure 10:
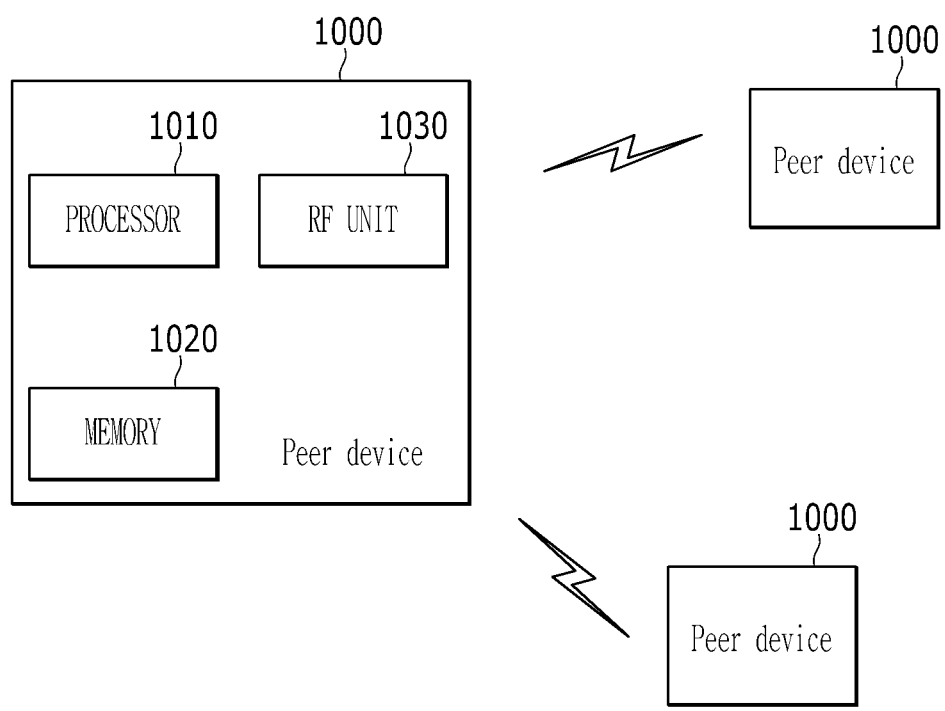
FIG. 10 is a block diagram illustrating a peer aware communication network according to an exemplary embodiment.

FIG. 10 is a block diagram illustrating a peer aware communication network according to an exemplary embodiment.

Referring to FIG. 10, peer aware communication network according to an exemplary embodiment includes a plurality of peer devices 1000. The peer device 1000 includes a processor 1010, a memory 1020, and a radio frequency unit (RF unit) 1030. The memory 1020 may be connected to the processor 1010 to store various pieces of information for driving the processor 1010 or at least one program executed by the processor 1010. The radio frequency unit 1030 may be connected to the processor 1010 to transmit/receive a wireless signal. The processor 1010 may implement functions, processes, or methods proposed by the exemplary embodiment. In this case, in the peer aware communication network according to the exemplary embodiment, a wireless interface protocol layer may be implemented by the processor 1010. An operation of the peer device 1000 according to the exemplary embodiment may be implemented by the processor 1010.

According to the exemplary embodiment of the present disclosure, the memory 1020 may be positioned inside or outside the processor 1010 and the memory 1020 may be connected to the processor 1010 through already known various means. The memory 1020 may be various types of volatile or non-volatile storage media. For example, the memory 1020 may include a read-only memory (ROM) or a random access memory (RAM).

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A method for communication between peer devices through a cyclic-superframe, the method comprising:
receiving a discovery request command frame including information about a first cyclic-superframe for a peering procedure;
transmitting, to a peer device that has transmitted the discovery request command frame, a discovery response command frame corresponding to the discovery request command frame; and
performing the peering procedure with the peer device based on the information about the first cyclic-superframe,
wherein the first cyclic-superframe includes at least one first superframe which has a first pattern, the at least one first superframe including a synchronization period, a discovery period, a peering period, a contention access period (CAP), and a contention free period (CFP), which are active or inactive, and
wherein the first pattern is determined based on whether each of the synchronization period, the discovery period, the peering period, the CAP, and the CFP included in the at least one first superframe is active or inactive.

2. The method of claim 1, wherein the transmitting of the discovery response command frame comprises:
transmitting the discovery response command frame to the peer device at an active CAP which appears in the first cyclic-superframe.

3. The method of claim 1, further comprising:
deleting information about a second cyclic-superframe which has been used to be discovered by the peer device from a cyclic-superframe structure list after receiving the discovery request command frame; and
adding the information about the first cyclic-superframe to the cyclic-superframe structure list.

4. The method of claim 1, further comprising:
updating a background cyclic-superframe to a second cyclic-superframe which is used to be discovered by the peer device before receiving the discovery request command frame.

5. The method of claim 1, further comprising:
receiving a peering request command frame including information about a third cyclic-superframe which is used for data communication at an active peering period in the first cyclic-superframe from the peer device;
transmitting a peering response command frame corresponding to the peering request command frame to the peer device; and
performing the data communication with the peer device based on the third cyclic-superframe.

6. The method of claim 5, further comprising:
deleting the information about the first cyclic-superframe from a cyclic-superframe structure list after receiving the peering request command frame; and
adding information about the third cyclic-superframe to the cyclic-superframe structure list.

7. The method of claim 1, further comprising:
receiving a cyclic-superframe advertise request command frame including information about a fourth cyclic-superframe which is used by a neighbor peer group from the neighbor peer group; and
adding the information about the fourth cyclic-superframe to a cyclic-superframe neighbor list.

8. The method of claim 7, wherein the receiving of the cyclic-superframe advertise request command frame comprises receiving the cyclic-superframe advertise request command frame at the peering period,
wherein the peering period is an active peering period or an inactive peering period.

9. The method of claim 1, wherein the first cyclic-superframe further includes at least one second superframe, which has a second pattern, the at least one second superframe including a synchronization period, a discovery period, a peering period, a contention access period (CAP), and a contention free period (CFP) which are active or inactive, and
wherein the second pattern is determined based on whether each of the synchronization period, the discovery period, the peering period, the CAP, and the CFP included in the at least one second superframe is active or inactive.

10. A peer device for communicating with another peer device through a cyclic-superframe, the peer device comprising:
a processor, a memory, and a radio frequency (RF) unit,
wherein the processor executes a program stored in the memory to perform:
receiving, by using the RF unit, a discovery request command frame including information about a first cyclic-superframe for a peering procedure;
transmitting, to a first peer device that has transmitted the discovery request command frame by using the RF unit, a discovery response command frame corresponding to the discovery request command frame; and
performing the peering procedure with the first peer device based on the information about the first cyclic-superframe,
wherein the first cyclic-superframe includes at least one first superframe which has a first pattern, the at least one first superframe including a synchronization period, a discovery period, a peering period, a contention access period (CAP), and a contention free period (CFP), which are active or inactive, and
wherein the first pattern is determined based on whether each of the synchronization period, the discovery period, the peering period, the CAP, and the CFP included in the at least one first superframe is active or inactive.

11. The peer device of claim 10, wherein when transmitting the discovery response command frame, the processor performs transmitting the discovery response command frame to the first peer device at an active CAP which appears in the first cyclic-superframe.

12. The peer device of claim 10, wherein the processor executes the program to further perform:
deleting information about a second cyclic-superframe which has been used to be discovered by the another peer device from a cyclic-superframe structure list after receiving the discovery request command frame; and
adding the information about the first cyclic-superframe to the cyclic-superframe structure list.

13. The peer device of claim 10, wherein the processor executes the program to further perform updating a background cyclic-superframe to a second cyclic-superframe which is used to be discovered by the another peer device before receiving the discovery request command frame.

14. The peer device of claim 10, wherein the processor executes the program to further perform through the RF unit:
receiving a peering request command frame including information about a third cyclic-superframe which is used for data communication at an active peering period in the first cyclic-superframe from the first peer device;
transmitting a peering response command frame corresponding to the peering request command frame to the first peer device; and
performing the data communication with the first peer device based on the third cyclic-superframe.

15. The peer device of claim 14, wherein the processor executes the program to further perform:
deleting the information about the first cyclic-superframe from a cyclic-superframe structure list after receiving the peering request command frame; and
adding information about the third cyclic-superframe to the cyclic-superframe structure list.

16. The peer device of claim 10, wherein the processor executes the program to further perform:
receiving a cyclic-superframe advertise request command frame including information about a fourth cyclic-superframe which is used by a neighbor peer group from the neighbor peer group; and
adding the information about the fourth cyclic-superframe to a cyclic-superframe neighbor list.

17. The peer device of claim 16, wherein when the processor performs the receiving the cyclic-superframe advertise request command frame, the processor performs:
receiving the cyclic-superframe advertise request command frame at the peering period,
wherein the peering period is active or inactive.

18. The peer device of claim 10, wherein the first cyclic-superframe further includes at least one second superframe, which has a second pattern, the at least one second superframe including a synchronization period, a discovery period, a peering period, a contention access period (CAP), and a contention free period (CFP), and
wherein the second pattern is determined based on whether each of the synchronization period, the discovery period, the peering procedure, the CAP, and the contention free period (CFP) is active or inactive.

* * * * *